June 23, 1953  H. G. KELLY  2,642,602
PIPE SWAB
Filed Nov. 9, 1949
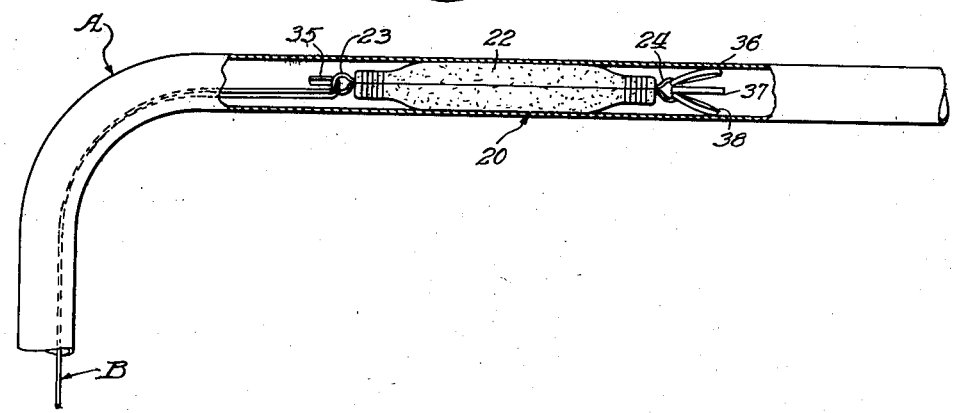
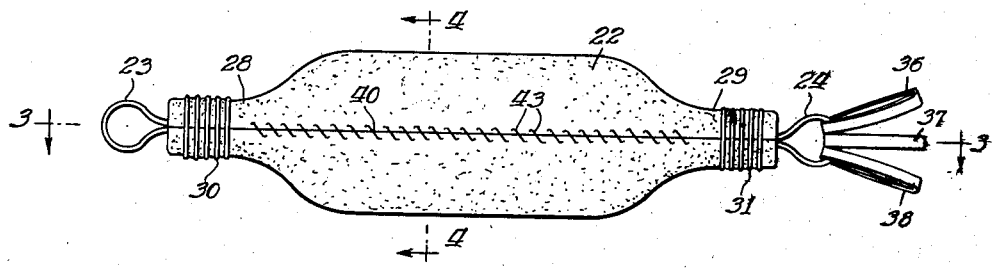
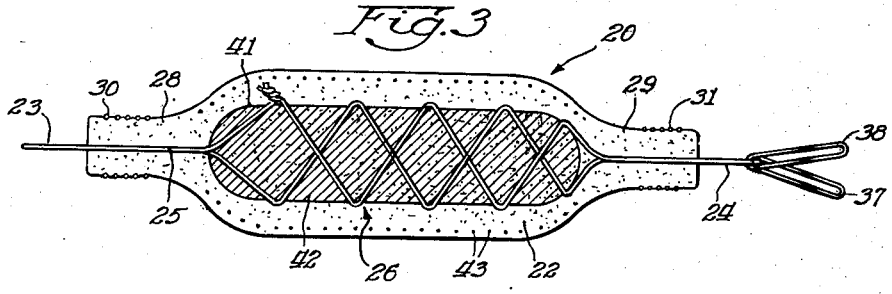
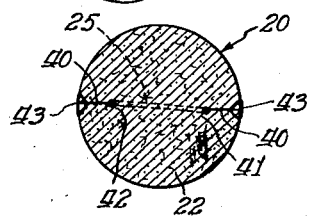
Inventor:
Harry G. Kelly
By: Joseph M. Gartner
Atty.

Patented June 23, 1953

2,642,602

UNITED STATES PATENT OFFICE 2,642,602

PIPE SWAB

Harry G. Kelly, Forest Park, Ill.

Application November 9, 1949, Serial No. 126,355

4 Claims. (Cl. 15—104.16)

This invention relates in general to devices for removing moisture from conduits and pipes, and it has particular reference to the provision of a swab advantageously adaptable to remove moisture from electrical conduit and pipes.

Heretofore, when confronted with a moisture problem in electrical conduits and pipes, the tradesman generally employed rags tied into knots which were secured to an end of a fish rod and, thereafter, the tradesman pulled the same through the conduit or pipe in an effort to remove the moisture therefrom.

Much difficulty has been encountered in following this procedure. For example, the knots sometimes became wedged into the conduit and, upon pulling the same, the fish rod would be pulled loose from the rags thus leaving the knotted rag in the conduit. It is obvious that a great deal of expensive time of the workman would be wasted in an effort to remove the knotted rag from the conduit. In some cases it would be impossible to remove the wedged rags which would require the removal of the entire line of conduit and replacing the same with a new one.

Moreover, the knotted rag technique presented further objectional features in that the absorbent characteristics and qualities of the rags were not sufficient to do a proper job. This necessitated frequent application of the knotted rag to the job and, more important, required replacement of the rags every time they became saturated. It is well known that a wet rag has very little moisture absorbent quality, particularly in the applications hereinbefore described.

The present improvements in a swab as contemplated by this invention are directed to simplify their construction and their mode of operation, and also to provide a swab which may readily and conveniently be employed universally to various types of conduits and pipes presently being commercially exploited. Moreover, the present device seeks to employ conventional parts wherever necessary and possible, thereby to effect a further substantial reduction in the cost over the prevailing types of swabs presently being employed.

According to one aspect of the present invention, the desired result may be obtained by utilizing a moisture absorbent material such as, for example, a sponge-like substance having the capacity to absorb and retain moisture, said sponge-like material being shaped and formed to define an elongated circular object arranged to advantageously pass through conduits and being provided with means at least at one end thereof to secure the same to a suitable electrical fish rod.

It has been found that the previously mentioned difficulties and objections encountered in removing moisture from electrical conduit and pipes may be eliminated by employing a conduit swab as taught by this invention. By an arrangement such as this it is obvious that the capacity of the conduit swab for retaining moisture may be materially increased. Moreover, because of the fact that the conduit swab is made of sponge-like material to define the shape as described as contrasted with the employment of a knotted rag as was heretofore employed, it is obvious that the subject device will be substantially more efficient in removing the objectionable moisture from the conduits and pipes.

Accordingly, an object and accomplishment of the invention is to provide a conduit swab formed of a sponge-like material and having means for securing the same to a conventional fish rod for advantageous pulling of the same through the conduits which are desired to be free of any moisture.

Another object and accomplishment of the invention is to provide an improved conduit swab by corelating and especially designing the various elements thereof, whereby there shall be such cooperation between said improved elements as will best serve the purpose of providing an efficient conduit swab capable of being manufactured at low cost and yet giving maximum of satisfactory service in use.

The invention seeks, as a further object and accomplishment to provide a conduit swab as contemplated herein and characterized by an arrangement of parts to more advantageously and satisfactorily perform the functions required of it and adapted to provide a compact unit which will successfully combine the factors of structural simplicity and durability, and yet be economical to manufacture.

Additional objects, features and advantages of the invention disclosed herein will be apparent to persons skilled in the art after the construction and operation are understood from the within description.

It is preferred to accomplish the various objects of the invention and to practice the same in substantially the manner as hereinafter more fully described, and, as more particularly pointed out in the appended claims.

In the accompanying drawing on which there is shown a preferred embodiment of the invention, Fig. 1 is an elevational view of the conduit swab embodying the features of the present invention and being shown in its operative position as disposed in a conventional conduit;

Fig. 2 is a side elevational view of the conduit swab depicted in Fig. 1;

Fig. 3 is a sectional view of the conduit swab depicted in Fig. 2 and being taken substantially on the line 3—3 in Fig. 2 and illustrating more clearly the construction of the internal portions thereof; and Fig. 4 is a sectional view of the swab depicted in Fig. 2 and being taken substantially on the plane of the line 4—4 in Fig. 2.

The drawing is to be understood to be more or less of a schematic character for the purpose of illustrating and disclosing a typical or preferred form of the improvements contemplated herein, and in the drawing like reference characters identify the same parts in the several views.

As one possible example of advantageous employment of the conduit swab, reference is made to the drawing, particularly Fig. 1, wherein there is illustrated the conduit swab with which the present invention is particularly concerned and designated in its entirety by the numeral 20 as being operatively disposed, for example, in a conventional electrical conduit designated in its entirety by the letter A.

The illustrated conduit may be of any size or character and is herein shown as being of conventional design. The conduit swab 20 with which the present invention is particularly concerned may be advantageously drawn through the conduits by means of the electrical fish rod designated in its entirety by the letter B.

Although, for purposes of illustration, an electrical conduit is being disclosed, it is obvious that the swab contemplated by this invention may be advantageously employed in other types of pipes and particularly where it is desired that moisture be removed from the internal portions of such pipes.

Suffice it to say, since the invention is not particularly concerned with the precise construction of the conduits or pipes with which the swab may be advantageously employed, and/or their associated parts, they will not be further described in detail, and it is deemed sufficient for all intentions and purposes herein contained to show only portions thereof adjacent to and co-operating with the conduit swab contemplated herein. It is to be understood that details of construction of such conduits and pipes with which the swab contemplated herein may advantageously be employed, and/or their associated parts, may be modified to suit particular conditions or to satisfy the engineering genius of various manufacturers, and I do not wish to be limited to the construction of these elements as set forth except where such construction particularly concerns the invention contemplated herein.

Having thus described, by way of example, a possible adaptation of the swab generally indicated at 20 and as contemplated herein, and having described the general environment surrounding the adaptation, the specific construction and cooperative functions of the parts of said swab with which the present invention is particularly concerned, will now be described in detail.

In the exemplary embodiment of the invention depicted in Figs. 1, 2 and 3, the swab 20 with which the present invention is particularly concerned comprises, in general, the body 22 formed of a moisture absorbent material such as, for example, a sponge to define an elongated circular in cross-section sausage-like shape, said body 22 being provided respectively at each end thereof with wire loops 23 and 24 which are a part of a continuous wire 25 which is interlaced into the body as at 26 in order to prevent separation of the sponge-like body and to provide strength to said body, said body also being provided respectively at each end with reduced portions 28 and 29 which is accomplished by providing respectively the lacings 30 and 31 which may be wire, cat gut or the like, said loop 23 being adapted to receive the hook end portions 35 (Fig. 1) of the fish rod B, and said loop 24 being provided with a plurality of cat gut loops 36, 37 and 38 which are provided in order to advantageously hook on to the swab 20 in the event that forward motion of the same is restricted in the conduit and if desired to remove the swab from the conduit in reverse direction.

It is notable that the body 22, before the lacings 30 and 31 are applied, defines a uniform shape similar to the central portions of the body. After the lacings 30 and 31 are applied the reduced end portions 28 and 29 are formed. In order to advantageously interlace the wire portions 25 as at 26, the body is provided with cuts along the line 40 and into the body defined by the lines 41 and 42 and the end of the wire is threaded backwardly and forwardly through the body in the manner as shown. After the wire is in its proper position the cut along the line 40 is sewed with large stitches as at 43 thereby to close the cut and provide a smooth circular shape to the body. Although only one cut along the line 40 is shown, it is necessary to provide a similar cut on the opposite side of the body in order to accomplish the advantageous threading of the wire as shown.

Particular attention is invited to an important feature of the invention which is the specific manner in which the wire 25 is interlaced in the body 22. This construction provides for elongation of the conduit swab so that it may advantageously pass through the conduits to perform its work. It is obvious in passing through conduits and pipes that the swab 20 will encounter curves and other restrictions at connections of the pipes which require that the swab be somewhat flexible in order to accommodate such obstructions. Although the construction thus described provides for elongation and bending of the conduit swab to meet the particular conditions to be encountered, it has strength and will not tear apart because of the interlacing of the wire 25 in the manner as disclosed as at 26. In other words, the body will stand rough abuse and heavy pulling without coming apart.

Another important feature of the invention is the provision of the loop 24 and the cat gut loops 36, 37 and 38. In the event that the swab 20 should meet with an obstruction in the pipe or conduit through which it is being drawn and this obstruction is of such nature that the conduit could not pass therethrough, it is necessary for the swab 20 to be drawn backwardly out of the conduit. This is advantageously accomplished by inserting a fish rod as at B and by manipulating the fish rod so that either the loop 24 or one or more of the cat gut loops 36, 37, and 38 will become engaged by the hook similar to 35 and the swab can then be withdrawn from the conduit.

It is obvious that the swab as disclosed in this invention may be used over and over again and that the moisture absorbing characteristics of the subject swab are substantially greater than the knotted rag technique formerly employed in moisture removing operations. After the swab is drawn through a conduit the moisture absorbed by the swab may be removed therefrom by merely squeezing the same with the hand of the operator and thereafter the swab will be in condition for another like operation.

Having thus described the general constructive features of the swab 20 as contemplated herein, the general operation of the device will now be explained. The fish rod is first inserted into the conduit A so that it will extend through the line. The conduit swab 20 is hooked onto the end portions 35 of the fish line B and the fish line is pulled through the conduit which causes the swab 20 to follow the same and absorb any moisture contained in the conduit. After the swab has completed the circuit the moisture is removed from the swab by squeezing the same in the operator's hand and, thereafter, the operation may be repeated until the operator is satisfied that all moisture is removed from the conduit.

In the event that there are obstructions in the conduit which will not permit the swab 20 to pass therethrough, the swab may be removed from the conduit by using another fish line as at B and hooking on to either the loop 24 or the cat gut loops 36, 37 and 38 whereupon the swab 20 may conveniently be withdrawn from the conduit.

In some applications it may be advantageous to hook fish rods as at B at each end of the conduit swab and the swab may be pulled through the conduit in one direction by one of the fish rods and pulled in the opposite direction by the other fish rod until the operators are satisfied that all objectionable moisture is removed from the conduit.

It is obvious that the swab may be conveniently carried in the workman's kit and be ready for use whenever it is desired. Moreover, the construction provides for repeated use of the swab over a long period of time.

From the foregoing disclosure, it may be seen that I have provided an improved swab which efficiently fulfills the objects thereof as hereinbefore set forth and which provides numerous advantages which may be summarized as follows:

1. Structurally simple, efficient and durable;
2. Economical to manufacture and readily adaptable to mass production manufacturing principles; and
3. The provision of a conduit swab formed of a sponge-like material and having means for securing the same to a conventional fish rod for advantageous pulling of the same through the conduits which are desired to be free of any moisture.

While I have illustrated preferred embodiments of the invention, many modifications may be made without departing from the spirit of the invention and I do not wish to be limited to the precise details and construction set forth, but wish to avail myself of all changes within the scope of the appended claims.

I claim:

1. A conduit swab comprising a body formed of a moisture absorbent resilient material, said body having slits extending radially inwardly from opposite sides of the body to provide an inner core, each slit being less than the distance between the axis of the body and the outer periphery thereof, means comprising a wire having open convolutions adapted to traverse the inner core in a plane from the radially inward portions of one slit to the radially inward portions of the other slit, said wire cooperating with the natural resilient characteristics of the moisture absorbent material to urge said material to maintain its normal shape, and said convolutions being collapsible responsive to elongation of the body beyond its normal length by external pressure applied to the body.

2. In a conduit swab comprising a body formed of a moisture absorbent resilient material to define an elongated shape circular in cross section, means defining a wire traversing and interlacing the inner central regions of said material so that the peripheries of the loops defined by the interlacing are substantially removed from the longitudinal axis of the body, said interlaced loops being adapted to cooperate with the natural resilient characteristic of the moisture absorbent material to provide a spring-like action in urging the material to maintain its normal shape, and said interlaced loops being collapsible toward the longitudinal axis responsive to elongation of the body beyond its normal length by external pressure applied to the body.

3. For a conduit swab, a body formed of a moisture absorbent resilient material having slits arranged longitudinally of and at opposite sides of the body, in combination with means comprising a wire having open convolutions arranged interiorly of the body to traverse the body in a plane from the radially inward portions of one slit to the radially inward portions of the other slit, said convolutions being adapted to collapse under external pressure applied to the body, and said wire cooperating with the natural resilient characteristics of the moisture absorbent material to urge said material to return to normal size after removal of the external pressure applied to the body.

4. In a conduit swab, the combination with a body formed of a moisture absorbent resilient material, said body having slits extending radially inwardly from opposite sides of the body to provide an inner core, of wire means having open convolutions adapted to embrace the inner core and arranged to traverse the inner core from the radially inward portions of one slit to the radially inward portions of the other slit, and said convolutions being collapsible responsive to elongation of the body beyond its normal length by external pressure applied to the body.

HARRY G. KELLY.

References Cited in the file of this patent

UNITED STATES PATENTS

| Number | Name | Date |
|---|---|---|
| 4,433x | Gethen | May 16, 1826 |
| 882,598 | Ward | Mar. 24, 1908 |
| 1,164,665 | Reeves | Dec. 21, 1915 |
| 1,172,746 | Silverstein | Feb. 22, 1916 |
| 1,611,820 | Delo | Dec. 21, 1926 |
| 1,853,238 | Shields | Apr. 12, 1932 |